United States Patent [19]

Muryoi

[11] 4,456,342
[45] Jun. 26, 1984

[54] ZOOM LENS BARREL CAPABLE OF CLOSE UP PHOTOGRAPHY

[75] Inventor: Takeshi Muryoi, Chigasaki, Japan

[73] Assignee: Nippon Kogaku K.K., Tokyo, Japan

[21] Appl. No.: 308,035

[22] Filed: Oct. 2, 1981

[30] Foreign Application Priority Data

Oct. 11, 1980 [JP] Japan ................. 55-142264

[51] Int. Cl.³ .................................. G02B 15/18
[52] U.S. Cl. ................................... 350/430
[58] Field of Search ....................... 350/429, 430

[56] References Cited

U.S. PATENT DOCUMENTS

| | | | |
|---|---|---|---|
| 3,970,368 | 7/1976 | Von Belvard | 350/430 |
| 4,101,202 | 7/1978 | Tesch | 350/430 |
| 4,210,387 | 7/1980 | Ogawa | 350/429 |
| 4,229,074 | 10/1980 | Nonogaki | 350/429 |

Primary Examiner—John K. Corbin
Assistant Examiner—Rebecca D. Gass
Attorney, Agent, or Firm—Shapiro and Shapiro

[57] ABSTRACT

A zoom lens barrel has a focusing operating member and a zooming operating member and a blocking member. When the blocking member is at a first position, movement of the focusing operating member is blocked so as to prevent focusing of a lens system with respect to an object at a distance shorter than a predetermined distance, and when the blocking member is at a second position, movement of the zooming operating member is blocked so as to prevent zooming outside of a predetermined focal length range of the lens system.

7 Claims, 3 Drawing Figures

ZOOM LENS BARREL CAPABLE OF CLOSE UP PHOTOGRAPHY

BACKGROUND OF THE INVENTION

1. Field of the Invention

This invention relates to a zoom lens barrel, and more particularly to a zoom lens barrel capable of close up photography.

2. Description of the Prior Art

A lens capable of photography up to a close up photography area only by a focusing operation may be said to be superior in quickness of photography because it permits continuous distance adjustment to be effected. However, in a zoom lens including a wide angle of view and a standard focal length, if the forward group lens thereof which effects distance adjustment is axially shifted excessively, deficiency of quantity of light and unsatisfactory lens aberrations occur in the wide angle area and therefore, very short distance photography (macro photography) is limited of itself. Therefore, in the lenses of such type, a change-over device for separating a magnification changing lens system from zooming by displacing such lens system to a position for macro photography has been provided and the focusing to a proximate object has been made possible after a change-over operation. However, such prior art is complicated in construction because there is provided therein a mechanism for axially shifting the entire lens system or for the macrofocusing of the magnification changing system. Also, such prior art involves two different operations of ordinary focusing and macrofocusing which are very confusing, and this leads to lack of quickness of photography.

SUMMARY OF THE INVENTION

It is an object of the present invention to provide a zoom lens barrel which requires no conventional change-over device.

It is another object of the present invention to provide a zoom lens barrel in which, at a focal length having a limitation in lens performance, a limit is provided so that focusing cannot be effected up to the close up photography area and at a focal length having no adverse effect in lens performance, focusing can be continuously effected up to the close up photography area, thereby achieving quickness of photography.

The invention will become fully apparent from the following detailed description of an embodiment thereof taken in conjunction with the accompanying drawings.

DESCRIPTION OF THE PREFERRED EMBODIMENT

Figure 1:
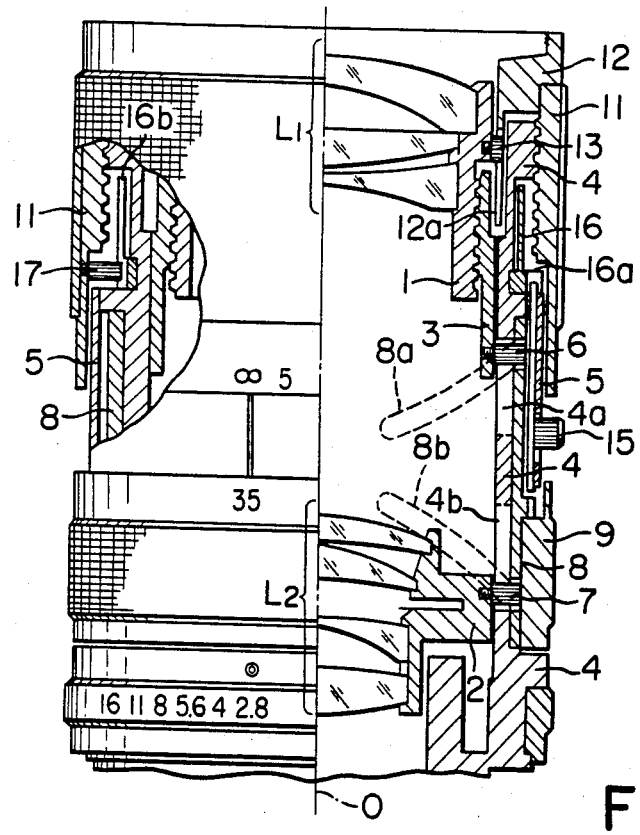
FIG. 1 is a front cross-sectional view of an embodiment of the present invention.

Referring to FIG. 1, there is shown a zoom lens whose focal length is variable between f=35 mm–70 mm. A forward lens group $L_1$ is held by a holding ring 1, and a rearward lens group $L_2$ is held by a holding ring 2. The holding ring 1 is threadedly engaged with a moving ring 3. A fixed cylinder 4 is disposed on the outer sides of these rings 1, 2 and 3, and pins 6 and 7 studded in the rings 3 and 2 extend through straight grooves 4a and 4b extending in the direction of the optical axis 0. The free ends of the pins 6 and 7 reach the interiors of cam slots 8a and 8b in a cam cylinder 8 disposed on the outer side of the fixed cylinder 4. Further outside of the cam cylinder 8, a zooming operating ring 9 is disposed for rotation with the cam cylinder.

A focusing operating ring 11 is threadedly engaged with the forward end of the fixed cylinder 4, and a focusing transmitting ring 12 is fixed to the forward end of the focusing operating ring. A pin 13 studded in the holding ring 1 is fitted in a straight groove 12a extending in the direction of the optical axis and formed in the ring 12.

Figure 2A:
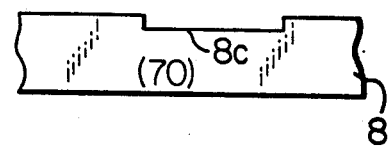
FIG. 2A shows a modification of the structure of FIG. 2.
Figure 2:
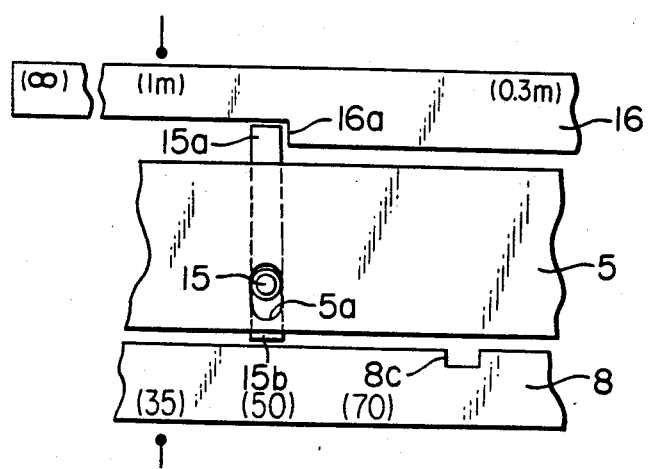
FIG. 2 is an enlarged plan view of essential portions thereof.

Between the fixed cylinder 4 and the cam cylinder 8, there is disposed a limiting plate 15 slidingly operable in the direction of the optical axis along a straight groove 5a formed in a cover 5 integral with the fixed cylinder 4, and the forward end 15a of the limiting plate is capable of bearing against the stepped portion 16a of a recess in an intermediate ring 16, as shown in FIG. 2. A pin 17 studded in the focusing operating ring 11 fits in a straight groove 16b extending the direction of the optical axis and formed in the intermediate ring 16, and if the ring 11 is rotated, the ring 16 may be rotated therewith without moving back and forth. As shown in FIG. 2, a locking groove or recess 8c for receiving the rear end 15b of the limiting plate 15 is formed in the cam cylinder 8. The stepped portion 16a lies at a position corresponding to the forward end 15a of the limiting plate when the photographing distance is 1 m, and the locking groove 8c lies at a position corresponding to the rearward end 15b of the limiting plate when the focal length is 70 mm.

Operation of the present embodiment will now be described.

When the zooming operating ring 9 is rotatively operated during zooming, the cam cylinder 8 is rotated in the same direction as the ring 9 and, due to the engagement between the pin 6 and the cam slot 8a, the ring 3 moves back and forth and with the aid of the groove 12a and the pin 13, the ring 1 moves back and forth without rotating while, on the other hand, with the aid of the pin 7 and the groove 8b, the ring 2 also moves back and forth without rotating and the lens groups $L_1$ and $L_2$ move back and forth in the direction of the optical axis.

On the other hand, when the focusing operating ring 11 is rotatively operated during focusing, the transmitting ring 12 is rotated in the same direction as the ring 11 and, due to the engagement between the pin 13 and the straight groove 12a, only the holding ring 1, namely, only the lens group $L_1$ is moved back and forth while rotating.

In the lens system of the embodiment, there is a limitation in lens performance with respect to close up photography when the focal length is not 70 mm and therefore, during the setting operation of the operating ring 9 in this range, the limiting plate 15 is at its forward position (in FIG. 2, the upper position) and the forward end 15a bears against the stepped portion 16a, so that focusing is possible only between ∞ to 1 m, focusing at a shorter distance being prevented. However, when the focal length is set to 70 mm, the locking groove 8c becomes opposed to the rearward end 15b of the limiting plate and, when the limiting plate 15 is operated to cause the rearward end 15b to fit into the locking groove 8c, zooming is locked, preventing zooming beyond 70 mm, and the engagement between the forward end 15a and the stepped portion 16a is released and thus, focusing becomes possible even on the very short distance side from 1 m to 0.3 m. It is on the telephoto side that zooming is locked, and the magnifiction of macro photography becomes highest.

As is apparent from FIG. 2, when limiting plate 15 is at a position ("first position") at which end 15a engages stepped portion 16a, plate 15 is prevented from moving away from this position while cylinder 8 is positioned for zooming at focal lengths less than 70 mm (since end 15b cannot move into groove 8c). When end 15b of limiting plate 15 is in groove 8c ("second position" of plate 15) and ring 16 is moved (to the left in FIG. 2) to effect focusing at distances shorter than 1 m, plate 15 is prevented from moving out of groove 8c (since end 15a cannot engage stepped portion 16a).

The locking of zooming may be effected at a focal length having no limitation in lens performance and for example, the locking groove 8c may be enlarged as shown in FIG. 2A so that, even at a close up area, zooming can be effected when the focal length is between 50 to 70 mm.

I claim:

1. In a zoom lens barrel having a focusing operating member movable relative to a fixed member for controlling a lens system for focusing, and a zooming operating member movable relative to said fixed member for controlling said lens system for zooming, the improvement comprising:
a blocking member provided on said fixed member and operable to move between a first position and a second position;
said blocking member, when at said first position, blocking movement of said focusing operating member so as to prevent focusing of said lens system with respect to an object at a distance shorter than a predetermined distance, and said blocking member, when at said second position, blocking movement of said zooming operating member so as to prevent zooming at focal lengths beyond a predetermined focal length of said lens system.

2. The improvement recited in claim 1, wherein said zoom lens barrel further includes means for preventing movement of said blocking member from said second position to said first position while said focusing operating member effects focusing with respect to an object at said shorter distance.

3. The improvement recited in claim 1, wherein said blocking member is provided between said focusing operating member and said zooming operating member and has a first portion for engaging said focusing operating member and a second portion for engaging said zooming operating member.

4. The improvement recited in claim 2, wherein said zoom lens barrel further includes means for preventing movement of said blocking member from said first position to said second position while said zooming operating member effects zooming at focal lengths less than said predetermined focal length.

5. In a zoom lens barrel having a focusing operating member movable relative to a fixed member for controlling a lens system for focusing, and a zooming operating member movable relative to said fixed member for controlling said lens system for zooming, the improvement comprising:
(a) a blocking member provided on said fixed member and operable to move between a first position and a second position,
said blocking member, when at said first position, blocking movement of said focusing operating member so as to prevent focusing of said lens system with respect to an object at a distance shorter than a predetermined distance, and said blocking member, when at said second position, blocking movement of said zooming operating member so as to prevent zooming at focal lengths beyond a predetermined focal length of said lens system; and
(b) means for limiting the movement of said blocking member to allow movement of said blocking member to said first position when said focusing operating member effects focusing with respect to an object at a disance longer than said predetermind distance and to allow movement of said blocking member to said second position when said zooming operating member effects zooming to said predetermined focal length.

6. The improvement recited in claim 5, wherein said focusing operating member and said zooming operating member are rotatively operable about the optical axis of said lens system, and said blocking member is movable in the direction of said optical axis.

7. The improvement recited in claim 6, wherein said focusing operating member is provided with a recess for receiving said blocking member when said focusing operating member effects focusing with respect to an object at said longer distance, and said zooming operating member is provided with a recess for receiving said blocking member when said zooming operating member effects zooming in a range near said predetermined focal length.

* * * * *